April 10, 1928.
N. J. CONRAD
FUSE
Filed Aug. 14, 1924
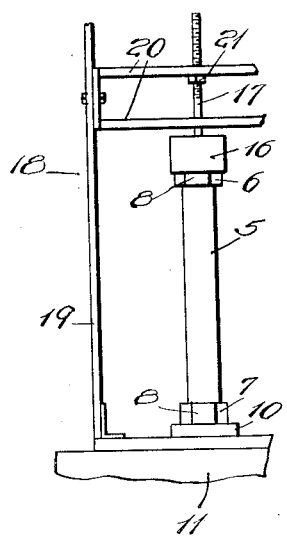
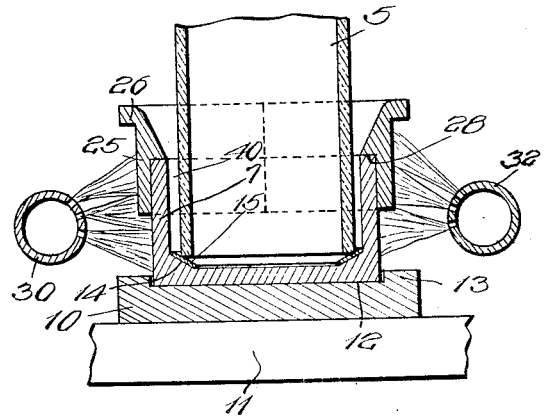
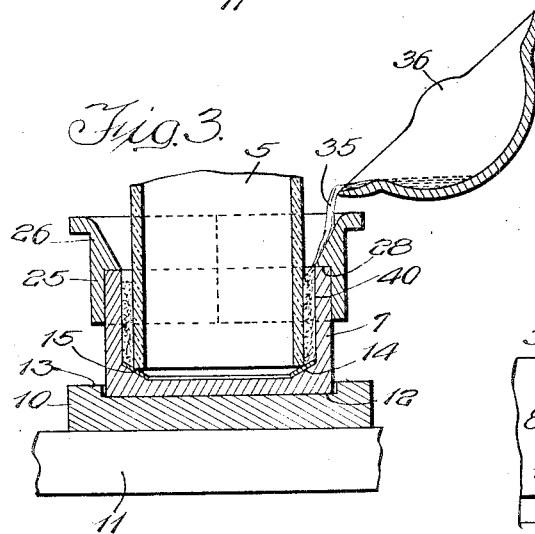
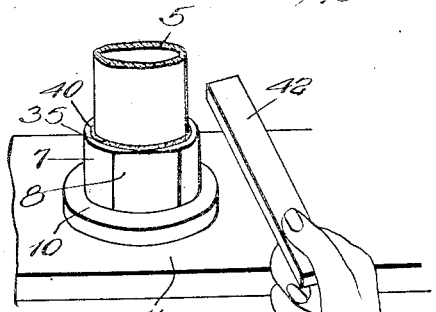
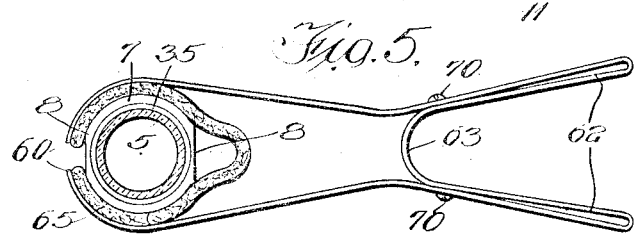
Inventor:
Nicholas J. Conrad Patented Apr. 10, 1928.

1,665,445

UNITED STATES PATENT OFFICE.

NICHOLAS J. CONRAD, OF CHICAGO, ILLINOIS, ASSIGNOR TO SCHWEITZER & CONRAD, OF CHICAGO, ILLINOIS, A CORPORATION OF ILLINOIS.

FUSE.

Application filed August 14, 1924. Serial No. 731,954.

This invention relates to improvements in fuses and the like.

More particularly the present invention relates to improvements in fuses of the "Schweitzer & Conrad" type and it has special reference to an improved method of and means for sealing the terminal ferrules upon the ends of the tube or other enclosing members of such devices.

In the devices of this sort the seal should be able to withstand, without leakage, severe temperature and pressure conditions which are apt to be imposed, and the problems of properly sealing the ferrules upon the tube and providing a suitable sealing substance have been difficult ones.

The sealing substance should be sufficiently strong to provide a tight seal and prevent leakage or escape of the fuse liquid, yet it should not break the container or impose severe stresses upon it, especially where the same is made of glass. The substance should not be of such a hardness that it will impose too severe internal stresses on the container, yet a certain amount of compression or pressure between the container, sealing substance and ferrule should be provided to secure a tight seal. Among the contributing factors toward the setting up of pressure on the container are the melting point and hardness of the seal, the relative expansion and contraction of the container, seal and ferrule, and the relative volumes of the seal and the material of the ferrule.

The melting point of the sealing substance should be sufficiently high that the seal will not melt or soften under the temperatures to which such devices are subject and the substance should be such that it will not be readily cracked by expansion or contraction of the parts. It should not corrode under ordinary atmospheric conditions and it should be insoluble in carbon tetrachloride, tetrachlorethylene and other carbon derivatives and fuse liquids. Where a flux is employed the sealing substance should not be corroded thereby.

I have, according to my present invention, provided an improved sealing substance and an improved method of sealing the tube or enclosing member. I provide a substance which meets the above requirements and the method which I employ comprises centering the tube and ferrule, heating the ferrule to expand it, pouring the molten sealing substance, settling the seal and removing any gas bubbles from it before it sets and chilling or quenching the ferrule while the sealing substance is in molten condition to obtain a tight seal. The sealing substance and method lend themselves admirably one to the other and by means of them an improved seal is produced.

In addition to the above improvements I provide an improved flux for making a tight seal, although it is possible to make the seals tight without it if precautions as to cleanliness are taken. The flux will not cause corrosion between the parts and it does not produce excessive amounts of gas bubbles in the seal.

In order to acquaint those skilled in the art with the nature and manner of practicing the present invention I shall now describe an embodiment of the invention in connection with the accompanying drawings in which;

Figure 1 is a fragmentary front elevational view showing a fuse in the clamp or rack for centering or properly positioning or aligning the tube and ferrule relative each other;

Fig. 2 is a vertical section through one end of the tube and the ferrule or cap, sealing base and pouring collar or funnel showing the step of heating the ferrule or cap;

Fig. 3 is a similar view showing the step of pouring the seal;

Fig. 4 is an isometric view showing the step of settling the seal and removing any gas bubbles; and Fig. 5 is a horizontal section through the tube, seal and ferrule showing the step and in plan the means for quenching the ferrule while the seal is in molten condition.

The body of the fuse selected for illustration is formed of a sleeve or tube 5 of insulating material. The particular tube shown is of cylindrical cross section and is made of glass, although it is to be understood that the particular formation may be varied and the body 5 may be of any other suitable or preferred material. Upon the ends of the tube 5 are the metal ferrules 6 and 7. These are usually of brass or other suitable conducting material and they form the terminals for the conducting parts contained within the tube 5 as well known in the art. The ferrules 6 and 7 are usually splayed or provided with diametrically opposite parallel flat surfaces 8 for cooperation with the terminal clips between which the fuse is connected.

The present invention is carried out substantially the same in connection with each of the ferrules 6 and 7 and I shall therefore explain it in connection with the sealing of only one of said ferrules, for example, the base ferrule 7. The conducting parts within the tube may be connected between the ferrules in the usual or any preferred manner. The upper ferrule usually has a pressure relief opening closed by a vent cap which is adapted to be blown clear of the opening by excessive internal pressures.

According to my present invention the ferrule 7, is loosely slipped upon the end of the tube 5 and the ferrule is then set upon a block 10. This block may be warmed or heated by a heating plate 11 upon which it rests. The block 10 has a depression 12 for receiving the ferrule 7 and an upstanding rim 13 fits snugly about the ferrule. The interior of the ferrule 7 has a tapered shoulder 14 upon which the end of the tube 5 seats. This shoulder 14 centers the tube 5 within the ferrule 7 and a suitable washer 15 is preferably interposed between it and the end of the tube.

Assuming that the upper ferrule 6 has already been sealed upon the tube 5, an inverted cup 16 carried by a threaded stem 17 is adjusted down over it and clamps the parts properly centered and aligned in a rack 18 comprising uprights 19 suitably mounted upon heating plate 11 and horizontal bars 20 in which the threaded stems 17 are adjustably mounted coaxial vertically with ferrule receiving depressions 12 of the blocks 10, suitable lock nuts 21 being provided to lock the fuse parts properly clamped in the rack. It is to be understood that in actual practice the rack preferably has a plurality or row of vertically aligned clamping cups 16 and blocks 10 for clamping a plurality of fuses in the rack at the same time. To secure the first ferrule upon the tube the parts may be clamped in the rack with the other ferrule loosely in place to align the parts. A split two-piece collar 25 having a flared or funnel shaped upper end 26 is then secured upon the outside of the upper end of ferrule 7 with a shoulder 28 resting upon the top edge of ferrule 7 so as to provide a filling funnel above the ferrule 7.

The base of the ferrule 7 may then be heated by the heating plate 11 while the sides of the ferrule and collar 25 are heated by additional heaters or burners 30 and 32 (Fig. 2) which may extend along and be common to a row of such setups. This expands the ferrule 7 and the sealing substance 35 is melted and poured as from a vessel 36 (Fig. 3) into the flared or funnel shaped upper end of collar 25 and runs in molten condition down into and substantially fills the space 40 between the tube 5 and ferrule 7.

The sealing substance which I prefer to employ comprises an alloy composed of lead (Pb) tin (Sn) and cadmium (Cd) in substantially either of the following proportions:

|  | Pb | Sn | Cd |
|---|---|---|---|
|  | Per cent | Per cent | Per cent |
| Hard | 25 | 50 | 25 |
|  | 33.3 | 33.3 | 33.3 |
| Soft |  |  |  | or in any variation of these proportions by which the same desirable characteristics are obtained. The ingredients are preferably mixed in molten condition. The first of the above alloys will be hereinafter referred to as "hard" while the other will be referred to as "soft." The "hard" alloy has been found especially suitable for sealing the types "A", "B", and "C", "Schweitzer & Conrad" fuses while the "soft" alloy is suitable for the "D" sizes. The tubes of the "A", "B" and "C" devices are smaller in diameter and have thinner walls. The "soft" alloy seems to exert less pressure (less stress) on the glass than the "hard" alloy and since there has actually been a tendency toward excessive breakage in the larger size tubes, the "soft" alloy may be used in connection therewith. The terms "hard" or "soft" are referred to with reference to the lead content of the alloy.

The "hard" or "soft" alloys both have a melting point of substantially 150 degrees centigrade or over and in that it is doubtful if fuses of this type ever meet an upper limit temperature higher than 100 degrees centigrade the measure of safety against melting or softening is sufficient to withstand the most severe conditions. It has been found in making temperature tests that due primarily to the pressure of the liquid and the vapors inside the tube, the vent will leak at about 80 degress centigrade so that the melting point of the seal is much higher than will ever be reached.

If the melting point of the seal were appreciably under 100 degrees centigrade it would be liable to melt or soften during the time that the fuse is carrying heavy current loads in the hot sun or other warm place. There is no possibility of this with the alloy which I provide and at the same time the internal stresses set up in the tube are minimized.

Under a Brinell hardness test using 500 kg. of a ten M. M. diameter ball for five seconds, the hardness of the "hard" alloy is approximately 24 and that of the "soft" alloy is approximately 22. I have made tests and found that the standard alloy of bismuth and tin in substantially the proportions of 35.7 and 64.3 has a hardness of 33 and that this breaks tubes rapidly and places severe stresses upon them. The melting point of the standard alloy is also lower, approximately 100 degrees centigrade. I also find that what I term a No. 294 alloy composed of bismuth, lead, tin and cadmium in substantially the proportions of 48% to 27% to 14% to 11% has a hardness of approximately 16 and that it exerts very little stress upon the tube. The serious objection to the last alloy is that it has a low melting point, about 70% centigrade. The harder the alloy the more stress there seems to be on the glass tubing and the problem of providing a softer alloy with sufficiently high melting point has been a difficult one.

The alloy seal which I provide does not show leakage between temperatures of negative 50 degrees centigrade and plus 100 degrees centigrade, the upper limit test having been conducted by placing a sealed tube containing carbon tetrachloride in boiling water for one or two hours. It is doubtful if tubes ever have to meet this severe a requirement. The seal holds against the heat upon exerting 50 pounds of air pressure in the tube while under water. The alloys which I provide are insoluble in carbon tetrachloride, tetrachlorethylene and other carbon derivatives and fuse liquids at temperatures between negative 50 degrees centigrade and plus 100 degrees centigrade and they show no sign of corrosion under ordinary atmospheric conditions.

The molten sealing substance 35 having been poured into the annular space 40 between the tube 5 and ferrule 7, the ferrule 7 is tapped or rapped as with a bar 42 as shown diagrammatically in Fig. 4. This quickly settles the sealing substance, completely, quickly and uniformly distributes the sealing substance through the space 40 and removes any gas bubbles, so that there will be no pockets, passages or interstices through which leakage is possible when the seal sets. The pouring funnel or collar 25 is preferably removed before settling the sealing substance.

To obtain a tight seal the ferrule is then quenched or cooled while the sealing substance is in molten condition. I find that the tightness of the seal is improved by quenching the brass parts of ferrules before the seal solidifies and the sealing substance which I have provided permits this quenching without setting up excessive stresses and pressures on the glass tube, as it solidifies or hardens. Most sealing substances that do not require quenching of the metal parts to provide a tight seal actually exert extreme pressures or stresses upon the tube to the point of fracturing the glass. By permitting quenching of the metal parts without setting up severe stresses as it hardens the sealing substance shows that its pressure or compression on the tube if allowed to cool slowly, is limited.

For the purpose of quenching the ferrule I provide a pair of quenching tongs comprising a band or strip of spring metal doubled upon itself to provide the jaws 60 and the intermediate portion of the strip or band is folded forwardly to provide handles 62 and a portion 63 which normally urges the jaws 60 to closed position. The jaws 60 are lined with felt or other suitable absorbent material 65 which will absorb and hold a quantity of cold water, for example, when dipped thereinto. To quench the ferrule or cap 7 the jaws 60 with the absorbent lining 65 are dipped into cold water and the jaws are opened and placed upon the ferrule 7 with the felt or other absorbent material against the ferrule as shown in Fig. 5, by grasping the handles 62, pressing them together placing the jaws about the ferrule then close into lamping engagement therewith under the action of spring portion 63. The doubled thicknesses of each handle 62 may be secured together by screws, rivets or other suitable means as shown at 70.

The quenching of the ferrule while the seal is molten contracts the ferrule first and as the seal solidifies it sets up just enough pressure or compression to provide a tight seal between the tube and ferrule without imposing severe stresses upon the tube. Seals that do not require quenching have usually placed severe stresses upon the tube when solidified. The relative coefficients of expansion and contraction of the seal, tube and ferrule are such and the seal has sufficient fluidity or give when hard that it will not be cracked by relative contraction and expansion of the parts.

The tube is preferably washed and dried and the ferrule thoroughly cleaned before sealing it upon the tube. Where precautions of this sort with reference to cleanliness are taken a flux is not ordinarily necessary for producing a tight seal. Where these precautions with reference to cleanliness are not taken or where a flux is for any other reason desirable or necessary to produce a tight seal, I find that a mixture of lactic acid, water and alcohol in the proportions of one-third each by volume is admirably adapted for this purpose. This flux is used in limited quantities on the brass ferrule as by wiping or painting the inside of the ferrule with it and it produces a tight seal. This flux does not cause corrosion between the different parts or elements under atmospheric conditions, it does not corrode the alloy seal and it may be used sparingly to minimize the formation of gas bubbles in the alloy which might otherwise be excessive and if not removed or settled would cause leakage.

The quenching of the ferrule in the manner described appears to contract the ferrule while the seal is sufficiently soft to yield to such contraction without cracking or subjecting the tube thereto. The contraction stresses which accompany solidification of the seal are not sufficient to set up injurious or severe stresses in the tube but they provide sufficient compression between the parts to form a tight seal. The tube seems thereby to be subject only to the contraction stresses of the seal and not to the greater or more severe contraction stresses of the ferrule.

I do not intend to be limited to the precise details or proportions shown and described, and I intend that modifications in the manner and order of practicing the various steps such as will be apparent at once to those skilled in the art are contemplated within the scope of the appended claims.

I claim.

1. In a device of the class described, the combination of a container, a ferrule therefore, and a seal between the ferrule and container, said seal comprising an alloy of lead, tin and cadmium proportioned to provide a melting point of substantially 100 degrees centigrade or over and a hardness under 25 for said seal.

2. In a device of the class described, a container having parts of glass and metal sealed together by an alloy composed entirely of lead, tin and cadmium.

3. In a device of the class described, a container having parts of glass and metal sealed together by an alloy of lead, tin and cadmium proportioned to provide a melting point of substantially 100 degrees centigrade or over and a hardness under 25 for said alloy.

4. In a device of the class described, the combination of a container, a ferrule therefore, and a seal between said container and said ferrule, said seal comprising a substance having a melting point over 100 degrees centigrade and a hardness under 25.

5. The method of sealing a metal ferrule upon a glass container which comprises clamping the container centered within the ferrule, heating the ferrule to expand it, pouring a sealing substance in molten condition between the ferrule and container and quenching the ferrule to cool it while the sealing substance is molten.

6. The method of sealing a ferrule upon the containing casing of a device of the class described which comprises placing the ferrule upon the container, heating the ferrule to expand it, introducing a sealing substance in molten condition between the ferrule and container, rapping the ferrule to settle the sealing substance and quenching the ferrule to cool it while the sealing substance is molten.

7. The method of forming a tight joint between a brass ferrule and a glass tube, which comprises heating the ferrule to expand the same, loosely inserting the tube in the ferrule, pouring an alloy of lead, tin, and cadmium into the space between the parts, and quenching the ferrule while the alloy is still hot, to contract the ferrule before the alloy solidifies.

8. The method of forming a tight joint between two concentric parts, one of which is of metal and the other of vitreous material which comprises heating the metal part to expand the same, loosely inserting the vitreous member into the metal member, pouring a melted alloy of lead, tin and cadmium into the space between the parts, and quenching the metal parts to contract the same before solidification of the molten alloy.

9. In a device of the class described, the combination of a frangible container, a ferrule therefor, and a seal cast between said container and the ferrule, said seal comprising a substance having a melting point over 100 degrees contigrade and a hardness under 25 by the Brinell test.

In witness whereof, I hereunto subscribe my name this 11th day of August, 1924.

NICHOLAS J. CONRAD.